March 1, 1938.  C. G. A. ROSEN  2,109,783
ENGINE
Filed Oct. 14, 1933   2 Sheets-Sheet 1
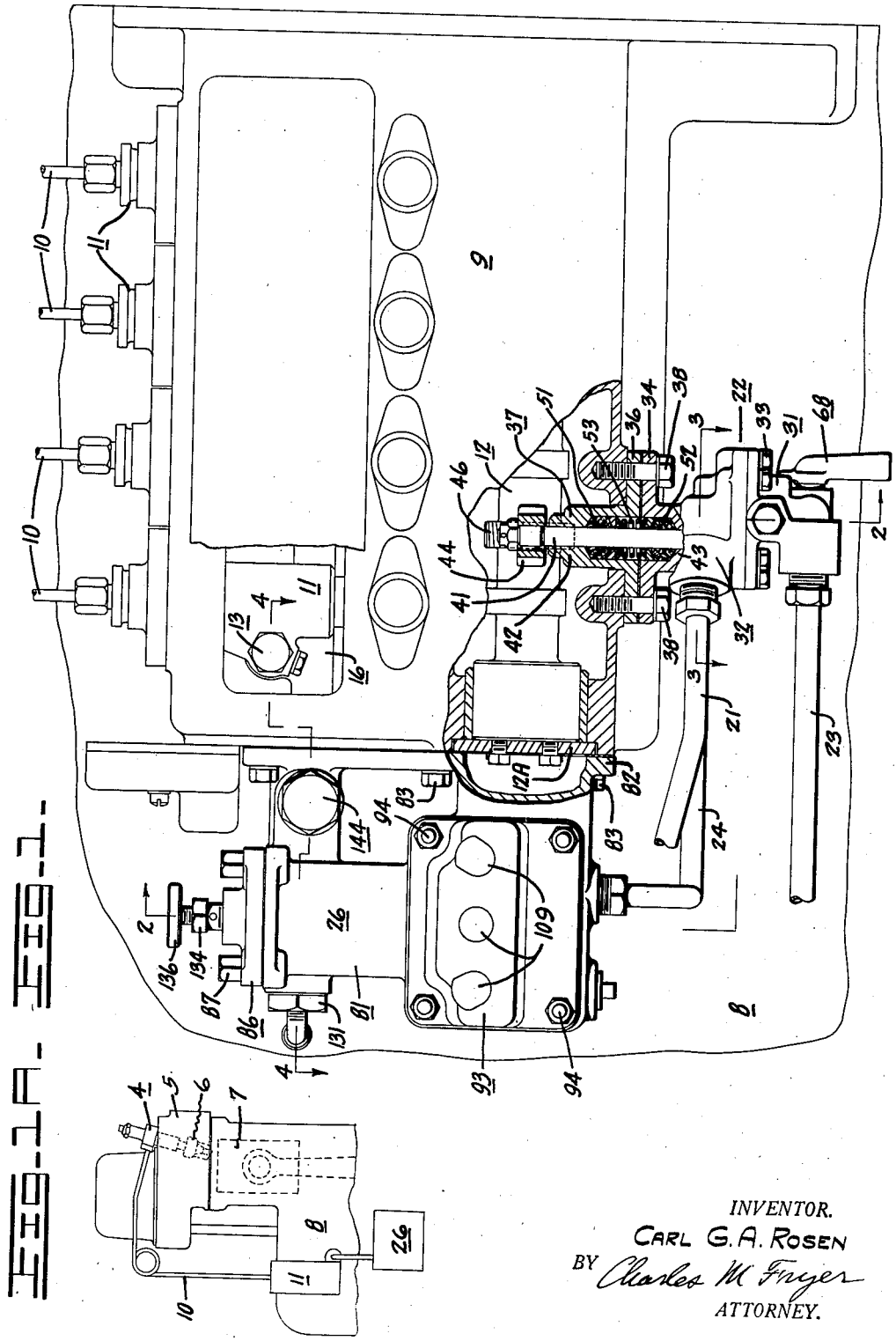
INVENTOR.
CARL G. A. ROSEN
BY Charles M. Fryer
ATTORNEY.

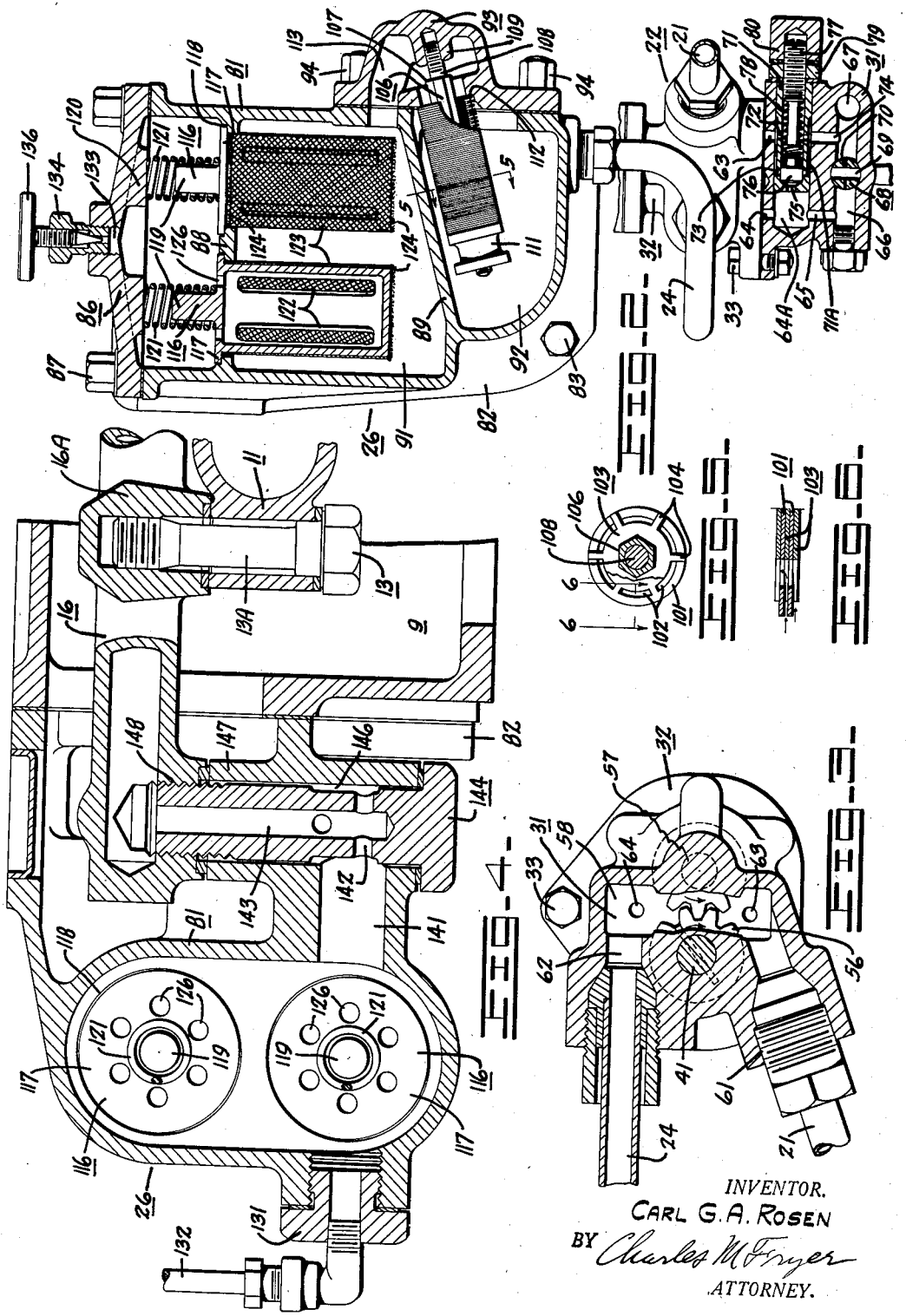

Patented Mar. 1, 1938

2,109,783

UNITED STATES PATENT OFFICE 2,109,783

ENGINE

Carl G. A. Rosen, Oakland, Calif., assignor to Caterpillar Tractor Co., San Leandro, Calif., a corporation of California Application October 14, 1933, Serial No. 693,595

11 Claims. (Cl. 123—139)

STATEMENT OF INVENTION

This present invention relates to compression ignition and the like engines, and more particularly to the provision of a fuel injection system therefor.

It is an object of the invention to provide an efficient, compact fuel injection system which is readily assembled on the engine or disassembled therefrom.

Another object of the invention is to provide a fuel injection system for compression ignition and the like engines having a plurality of parts adapted to be mounted as a unitary assembly on the engine.

Another object of the invention is to provide a fuel filter having a plurality of filtering elements which are easily removed for cleaning or replacement.

Another object of the invention is to provide a fuel injection system for compression ignition and the like engines, said system including single discharge orifice fuel injection nozzles and a two-stage filter for filtering the fuel supplied thereto.

Another object of the invention is to provide a fuel injection system for compression ignition and the like engines, the parts of which are easily accessible for inspection or repair.

Other objects will appear as the description progresses.

DESCRIPTION OF FIGURES

Fig. 1 is a fragmentary side elevation of a compression ignition engine disclosing the fuel injection pump housing mounted on the engine block and the fuel transfer pump and fuel filter mounted on the pump housing.

Fig. 1A is a schematic view illustrating a part of the fuel injection system.

Fig. 2 is a section on the line 2—2 in Fig. 1.

Fig. 3 is a section on the line 3—3 in Fig. 1.

Fig. 4 is a section on the line 4—4 in Fig. 1.

Fig. 5 is a detailed view taken on the line 5—5 in Fig. 2.

Fig. 6 is a fragmentary section taken on the line 6—6 in Fig. 5.

DESCRIPTION OF MECHANISM

Fuel injection system

The fuel system is of the solid injection type in which only fuel—not mixed with air—is injected into the combustion chambers of the engine, in an atomized state by the fuel injection nozzles. The system is designed to preclude air from becoming entrappped with the fuel. The structure of the system provides a unitary assembly which can be easily assembled on the engine or removed therefrom, the relation of certain of the parts eliminating the use of long fuel conduits. The portion of the fuel injection system not disclosed in detail is fully described in my copending application, Serial No. 684,179, filed August 8, 1933.

Each fuel injection nozzle 4 (Fig. 1A) is connected by means of conduit 10 to a fuel injection pump 11 (Figs. 1 and 1A) from the discharge end of which, a measured quantity of fuel is forced under pressure into the fuel injection nozzle associated therewith. Each nozzle 4 (Fig. 1A) is suitably mounted in cylinder head 5 and injects fuel through a single discharge orifice into precombustion chamber 6 formed therein. Each precombustion chamber 6 communicates through restricted orifices with a main combustion chamber formed between the bottom wall of head 5 and a piston 7 in engine block 8.

Pumps 11 (Fig. 1) are mounted in fuel injection pump housing 9, which is suitably mounted on block 8. All of the pumps contain plungers which are actuated in timed relationship by means of cams on camshaft 12 to force fuel through the nozzles in accordance with the firing order of the cylinders. Each pump is connected by fitting 13 to fuel manifold 16 to which fuel is supplied from the tank, by means to be described. In actual operation, the entire system is always kept full and solid with fuel.

Means is provided for supplying fuel to the fuel injection pump manifold 16 (Fig. 1). In order that the fuel supply shall be adequate for all demands of the fuel injection pumps, an excess quantity of fuel is pumped from a main fuel supply tank, by means of a fuel transfer pump. The excess quantity of fuel above the requirements of the fuel injection pumps, is by-passed back to the fuel tank. In practice, about 10 times the quantity of fuel necessary for the fuel injection pumps, is handled by the fuel transfer pump. The by-passing of the large excess quantity of fuel back to the main tank, provides a line of least resistance, so that entrained air can leave the pressure system and be by-passed back into the main fuel tank. From the fuel tank (not shown), fuel flows under a positive head through pipe 21 (Fig. 1) to the suction side of fuel transfer pump 22. Fuel transfer pump 22, which is driven from the pump actuating camshaft, is of such design as to withdraw always an excess quantity of fuel from the fuel tank and by-pass that excess quantity through pipe 23 to the fuel tank. From fuel transfer pump 22, a portion of the fuel is forced through pipe 24 into fuel filter 26, which has a direct connection with fuel injection pump manifold 16.

Fuel transfer pump

As described hereinbefore, the fuel transfer pump performs the functions of charging the individual fuel injection pumps for each cylinder by providing a constant head of air free fuel, and drives off air entrained in the fuel system by the by-pass of a large volume of excess fuel. The fuel transfer pump is attached outside the injection pump housing to prevent contamination of the lubricating oil by fuel leakage. The fuel transfer pump is driven from the pump actuating camshaft, the drive shaft therefor extending within the fuel injection pump housing.

Fuel transfer pump 22 (Figs. 1 and 2) includes base 31 secured to housing 32 by screws 33. Housing 32 terminates at its upper end (Fig. 1) in flange 34 engaging corresponding flange 36 of bracket 37 which extends within and closes an aperture in fuel pump housing 9. Screws 38 extend through apertures in flanges 34, 36 and have threaded engagement with said housing 9 to secure pump 22 thereto.

The drive connection for the fuel transfer pump is established by the operation of securing the pump to the fuel injection pump housing. Pump drive shaft 41 (Fig. 1) is journaled in boss 42 in bracket 37 and boss 43 in housing 32, and has gear 44 secured on the upper end thereof and meshing with gear 46 integral with camshaft 12. When pump 22 and bracket 37 are secured to housing 9 by screws 38, gears 44, 46 are engaged. Sealing means are provided for preventing passage of any lubricant from the fuel injection pump housing into the fuel transfer pump, and for preventing passage of any fuel from the transfer pump into the fuel injection pump housing. Said sealing means includes packings 51, 52 seated in bracket 37 and housing 32, respectively, and engaging shaft 41. Compression spring 53 is placed between suitable retainers engaging the opposed faces of said packings to maintain said packings in tight engagement with drive shaft 41. It is to be noted that packings 51, 52 have inwardly diverging end surfaces whereby the pressure of spring 53 is applied most advantageously to maintain such engagement.

It is believed obvious from the foregoing that the above-described construction lends itself readily to assembly and disassembly, and that effective means are provided for sealing the lubricating and fuel oils from each other. It is to be noted that the operation of securing the bracket to the housing establishes a driving connection between the drive shaft and the camshaft.

The transfer pump proper is mounted in housing 32 and provides means for supplying a constant head of air free fuel to the various fuel injection pumps, a large volume of fuel being by-passed and returned to the fuel tank carrying with it any air bubbles entrained in the fuel. Shaft 41 (Fig. 3) carries pump gear 56 meshing with a similar gear on stub shaft 57 in pump chamber 58 formed by a recess in the bottom of upper casing part or housing 32, which is closed by the upper surface of lower casing part 31. Chamber 58 (Fig. 3) communicates with aperture 61 at the suction side of the gears, which is threaded for connection with pipe 21 which leads from the fuel tank. The discharge end of chamber 58 communicates, through passage 62 in upper part 32 with pipe 24 connected to fuel filter 26 (Fig. 1). In the bottom wall of chamber 58 are formed (Fig. 3) a pair of apertures 63, 64 One aperture 63 is at the suction side of the pump gears, and the other aperture 64 is at the discharge side of the pump gears. Aperture 64 (Fig. 2) leads to an end of an upper passage 64A formed in lower part 31; and said end of passage 64A communicates with a downwardly extending passage 65 also in lower part 31. Passage 65 in turn communicates with a lower cross passage 66, formed in the bottom of part 31. Passage 66 communicates at its discharge end with passage 67 which is threaded for connection with pipe 23 (Fig. 1), which by-passes the fuel back to the tank. In passage 66 (Fig. 2) is positioned a hand-operated plug valve 68 which has a large aperture 69, whereby passage 66 can be opened and closed. Small aperture 70 in valve 68 at right angles to aperture 69 provides a pressure relief passage when the valve is in closed position.

Between pump chamber 58 and passage 66 is mounted a valve (Fig. 2), including a hollow sleeve 71 fitted closely in an end of passage 64A and provided with spaced pairs of upper and lower apertures 72 and 73, respectively. When the pump is not operating but when the fuel injection system is being primed, as will be hereinafter explained, aperture 63, at the suction side of the pump gears, allows fuel to flow transversely through sleeve 71 by means of opposed apertures 72, and then through passage 74 which communicates with the discharge end of passage 66 and with lower apertures 72. Adjacent the closed end of passage 64A, sleeve 71 is formed with aperture 75, which is closed normally by piston valve member 76. When piston 76 is moved to the right as viewed in Fig. 2, fuel flows through aperture 75, apertures 73, around reduced portion 71A of sleeve 71, and apertures 72 to passage 74. Adjusting screw 77 is threaded in sleeve 71 whereby the pressure exerted by spring 78 on piston 76 is adjusted. Lock nut 79 maintains screw 77 in adjusted position, cover 80 being provided to prevent tampering with the adjustment.

In operation, the fuel transfer pump works as follows: Before the engine is started, hand-operated valve 68 is turned to place its aperture 69 in communication with passage 66. This allows fuel to flow from the tank by gravity through pipe 21, to the inlet side of pump chamber 58, down through aperture 63, through upper aperture 72, across sleeve 71, through lower aperture 72, passage 74, passage 66, aperture 69, in valve 68, up through passage 65, aperture 64, passage 62, and out of pipe 24 to the fuel filter. During the described flow of the fuel, the pump is not being actuated because the engine is dead. The gravity flow of the fuel, before the engine is started, is to insure that the entire system is solid with fuel. Also, the gravity flow with valve 68 open, provides means for priming the entire system with fuel should any portion thereof be removed for cleaning etc., and then replaced.

When it is desired to start the engine, valve 68 is closed, the position shown in Fig. 2. Upon starting of the engine, fuel will be drawn by the pump gears, to the discharge side of the pump, from which the engine-demand stream of fuel will flow to the fuel oil filter, via passage 62, and pipe 24. Surplus or excess fuel flows down through aperture 64 into passage 64A, from which parallel paths of or a divided flow are provided to passage 67 leading to the fuel tank. One of said parallel paths or separate divisions of flow leads through valve aperture 75, sleeve apertures 73, around sleeve 71, through lower aperture 72, passage 74, and passage 66, to passage 67. The second of the parallel paths or divisions of flow leads from the left end of passage 64A (as viewed in Fig. 2) through passage 65, and passage 66, by means of restricted aperture 70 in valve 68, to passage 67 to the fuel supply tank. Also, during operation of the pump some of the fuel being pumped through aperture 64 on the discharge side of the pump gears and through aperture 75, will flow through aperture 63 on the suction side of the pump gears. Spring 78 is set to yield at a pressure of approximately 15 pounds to insure a constant head of fuel at the fuel injection pumps. Small aperture 70, in valve 68, provides a constantly open by-pass, to accommodate certain operating conditions of the pump. The size of the aperture is sufficiently small so that the desired head of fuel is maintained. The provision of separate or divided paths of flow in the by-pass line prevents surges in the fuel chamber, thereby providing a constant pressure head in the discharge line leading to the fuel injection pumps.

Thus, it is seen that the fuel transfer pump provides a constant head of air free fuel, driving off air entrained in the fuel by virtue of the action of the pump gears 56 and 57, and because of the provision of the separated passages. These separated passages not only prevent surges but provide, by enabling a divided flow of the excess fuel to the passage 67 and into by-pass pipe 23, a line of least resistance so that entrained air will leave the pressure system and be by-passed back to the main fuel tank along with the excess fuel. Not only do these separated passages provide a line of least resistance for driving off the entrained air, but they eliminate the possibility of turbulent currents existing where a flow of fuel encounters resistance and which is apt to result in deleterious emulsification of the fuel and air.

It is to be noted that the above-described construction provides a mounting of the pump permitting quick assembly or disassembly thereof on the engine, while providing an effective seal between the lubricant for the fuel injection pump drive and the fuel passing through the fuel transfer pump.

*Fuel filter*

In internal combustion engines of any type, it is desirable that the fuel be filtered to remove any foreign matter, but in compression ignition engines and the like, such as Diesel engines, it is essential that pure fuel be supplied to the injection pumps and injection nozzles so that no particles are present in the fuel to injure the pumps and nozzles, or to prevent seating of the needles of the fuel injection nozzles.

According to the instant invention, a fuel filter is provided which has two stages of filtering means arranged in series; the first stage is of the non-collapsible type and removes all relatively large foreign particles from the fuel and presents a relatively large filtering area, and the second stage removes all the smaller particles and any fibrous matter which may pass through the first stage. I have found it very desirable in filters for compression ignition and the like engines to provide a plurality of stages of filtering elements, as a single stage filter would be apt to become clogged due to the large amount of foreign matter usually present in fuel oils suitable for use in such engines. The two filtering means are mounted in vertically disposed compartments in a housing which provides an end cover for the fuel injection pump housing and to which the fuel manifold 16 is directly secured. Access is provided to the filtering elements by means of detachable covers, the lower set of elements being mounted on one of said covers, which cover also provides communication between the lower and upper compartments. Thus, it is seen that the filtering elements can be installed easily and are readily removable for cleaning or replacement.

Filter assembly 26 (Figs. 1 and 2) includes housing 81 having integral flange 82 by means of which screws 83 secure the fuel filter to housing 9, suitable communicating apertures being provided as described later. Flange 82 (Fig. 1) engages thrust plate 12A on camshaft 12 to locate said camshaft in housing 9. Said housing 81 (Fig. 2) is open at the top and has top cover 86 secured thereto by screws 87 to close said opening, a suitable gasket being interposed. Said cover 86 closes an upper compartment formed between said cover and apertured wall 88. Spaced below wall 88, inclined wall 89 is provided to form upper filtering compartment 91 and lower filtering compartment 92. Communication between filtering compartments 91 and 92 is established through cover 93 closing apertures, leading from said compartments and secured to housing 81 by screws 94.

Thus, it is seen that the fuel filter housing is divided into a plurality of compartments. The first or lowest compartment receives fuel from the transfer pump and has the first stage filtering elements mounted therein; the fuel is transmitted through the first stage filtering elements to the second compartment which receives the partially filtered fuel and has the second stage filtering elements mounted therein. The third compartment receives the completely filtered fuel which has passed through the second stage filtering elements, and has a plurality of outlets leading to the fuel gauge, to a valve for releasing any air entrained in the fuel, and to the fuel manifold, respectively. Compartment 92 (Fig. 2) receives fuel through conduit 24 from the fuel transfer pump and has the primary or first stage filtering elements disposed therein, said elements being placed in said compartment when cover 93 is secured to housing 81. A plurality of primary filtering elements are provided, only one of which is shown, and each filtering element includes alternate flat disks held close together, and formed to provide for ingress of fuel at their edges, and egress of fuel through a central aperture to the second compartment, the opening in the edges of the disks being sufficiently narrow to prevent entrance of foreign particles except of a very small size. Each primary filtering element being formed of disks is non-collapsible, so that it resists pressure caused by foreign matter restricting the flow of fuel therethrough and causing increased pressure on the walls thereof.

The specific construction of the disks is illustrated in Figs. 5 and 6. One type of disk 101 is provided with a solid outer edge from which are spaced a plurality of arcuate slots 102. At its center, disk 101 is provided with a hexagonal aperture. The other type of disk 103 is shown above disk 101. Disk 103 has a plurality of recessed portions around its edge formed between a plurality of radial extensions 104, while at its center a hexagonal aperture is provided in the same manner as in disk 101. It is to be noted that the radii of the recesses formed between extensions 104 coincide with the inner radii of arcuate slots 102 in disk 101 while the radial length of extension 104 is equal to the radius of disk 101. Each extension 104 coincides with a solid portion in disk 101 between adjacent arcuate slots 102.

The hexagonal central apertures enable maintaining alternate disks 101, 103 in their adjusted position by means of hexagonally sectioned sleeve 106. In assembly, the disks are placed alternately over sleeve 106, after which the ends of sleeve 106 (Fig. 2) are flanged outwardly as at 107, whereby the plurality of disks mounted thereon are permanently retained in place, the sleeve being of sufficient length to permit separation of the disks for cleaning.

Each primary filter element or cartridge is mounted on cover 93 (Fig. 2) by means of stud 108 (Fig. 2) threaded in boss 109 of cover 93 and extending through sleeve 106. As seen in Fig. 1, three bosses 109 are provided for mounting the three primary filter elements. Nut 111 (Fig. 2) threaded on the opposite end of stud 108 clamps the plurality of disks together between annular face 112 of cover 93 and nut 111. When clamped in position, the recessed portions in alternate disks 103 (Fig. 6) provide means for ingress of fuel to the filter element, the thickness of disks 103 determining the size particles which are filtered out of the fuel. Arcuate slots 102 with said recessed portions provide a passage through the primary filter element so that the partially filtered fuel can pass upwardly through the element through passage 113 (Fig. 2), from compartment 92 to the second filtering compartment 91.

In the second filtering compartment (Fig. 2), a plurality of secondary filtering elements or cartridges are mounted. Each of the elements includes a cylindrical frame 116 having an annular flange 117 at the top seated in recess 118 formed around an aperture in wall 88. Integral boss 119 disposed centrally at the top of frame 116 and extending upwardly therefrom provides a seat for spring 121 which surrounds said boss and is compressed between boss 120 of top cover 86 and frame 116. Thus, it is seen that the secondary filtering elements are held in place by the top cover and can be lifted out for cleaning or replacement when the top cover is removed. Further, the strength of spring 121 is such that if the filtering elements held in place thereby should become completely clogged, the developed pressure will cause said spring to yield whereby the filtering elements will act as valves and will be lifted out of recesses 118 to permit a continued flow of fuel. This feature insures a constant fuel supply for the fuel injection pumps.

Frame 116 (Fig. 2) is provided longitudinally of its cylindrical portion with elongated slots 122 which provide for ingress of fuel. Slots 122 are covered by cylindrical extremely fine mesh screen 123 which is welded to said frame 116 at its ends as indicated at 124. Filtered fuel which is admitted within frame 116 through screen 123 passes upwardly through a plurality of apertures 126 (Figs. 2 and 4) formed in the top wall of said frame 116 around boss 119, to the third compartment of housing 81.

As stated above, the third compartment is provided with three outlets. At one end thereof, fitting 131 (Fig. 4) communicates therewith and with conduit 132 leading to a suitable fuel pressure gauge, not shown. The second outlet (Fig. 2) is provided at the highest portion of the fuel filter for venting any entrained air. The bottom face of cover 86 converges upwardly from the edges to a central recess 133, which has communication with the atmosphere through fitting 134 as controlled by valve screw 136. Valve 136 is used principally when the fuel system is first installed to permit escape of any air entrained in the fuel. The slanting contour of the bottom face of cover 86 insures recess 133 being the highest point of the filter in any tilted position of the engine. Thus no air pockets can occur in the filter when the fuel injection system is primed with the engine in a tilted position.

The third outlet from the upper compartment is through passage 141 (Fig. 4) which has communication through a plurality of apertures 142 with internal passage 143 in fitting 144. Fitting 144 provides a means for securing the fuel manifold 16 to the fuel filter and passes fuel therefrom to said fuel manifold. Said fitting 144 extends through aperture 146 in boss 147 of housing 81 and has threaded engagement at 148 with fuel manifold 16. Suitable gaskets are interposed between manifold 16, fitting 144, and boss 147. Manifold 16 extends within fuel injection pump housing 9 and has a boss 16A associated with each fuel injection pump, adapted to receive a fitting 13. Each fitting 13 serves to secure said manifold to the associated fuel injection pump, being of reduced diameter at 13A to pass fuel to said associated pump.

From the foregoing description, it is seen that the fuel filter includes two phases of filtering elements, the first of which removes larger foreign particles, while the second removes smaller particles. It is to be noted that the arrangement of the fuel compartments and filter elements provides a path of fuel flow which rises at all times, provision being made against any air pockets which would permit the entraining of any air in the fuel during operation. It is to be noted that the detachable cover 93 which provides a path of flow between the primary and the secondary filtering compartments also serves to mount the primary filtering elements.

The compact arrangement of the fuel transfer pump and fuel filter on the fuel injection pump housing 9 provides for ready attachment or removal of these parts as a unit, so that assembly or disassembly thereof is facilitated. It is to be noted also that this construction provides a materially simplified engine block structure, as it is unnecessary to provide means for mounting the various elements individually on the block. It is to be noted also that the filter is placed on the pressure side of the fuel transfer pump, so that the fuel is filtered under pressure, and so that only the fuel conducted to the fuel injection pumps is filtered.

Therefore, I claim as my invention:

1. In a compression ignition and the like engine having a fuel injection system, a unitary assembly adapted to be connected in said system and to be mounted as a unit on the engine, said assembly comprising a fuel injection pump housing, a plurality of fuel injection pumps mounted on said housing, a fuel transfer pump mounted on said housing exteriorly thereof, a fuel filter mounted on said housing exteriorly thereof, and a manifold extending from adjacent said fuel filter along and connected to each of said fuel injection pumps.

2. In a compression ignition and the like engine having an engine block, a housing adapted to be mounted on said block, a plurality of fuel injection pumps mounted on said housing, a camshaft in said housing for operating said pumps, a fuel transfer pump for supplying fuel to said fuel injection pumps, said fuel transfer pump comprising a casing detachably secured to said housing and a drive shaft mounted in said casing and having operative engagement with said camshaft, a fuel filter detachably secured to said housing, and a fuel manifold secured to said filter and connected to each of said fuel injection pumps.

3. In a compression ignition and the like engine having a fuel injection system, a unitary assembly adapted to be connected in said system and to be mounted as a unit on the engine, said assembly comprising a fuel injection pump housing, a plurality of fuel injection pumps mounted on said housing, a fuel transfer pump mounted on said housing exteriorly thereof, and a fuel filter mounted on said housing exteriorly thereof, said fuel transfer pump being adapted to supply a constant head of filtered fuel to said fuel injection pumps.

4. In a compression ignition and the like engine having an engine block, a housing adapted to be mounted on said block, a plurality of fuel injection pumps mounted on said housing, a camshaft in said housing for operating said pumps, a fuel transfer pump for supplying fuel to said fuel injection pumps, said fuel transfer pump comprising a casing detachably secured to said housing exteriorly thereof and a drive shaft mounted in said casing, extending into said housing and having operative engagement with said camshaft.

5. In a compression ignition and the like engine having an engine block, a housing adapted to be mounted on said block, a plurality of fuel injection pumps mounted in said housing, a camshaft in said housing for operating said pumps, a fuel filter detachably secured to a wall of said housing adjacent an end of said camshaft, and a fuel manifold secured to said filter and to said fuel injection pumps, said fuel filter having a wall portion thereof adjacent said housing wall for maintaining said camshaft in axial position in said housing.

6. In a fuel injection system, a fuel injection pump housing having a plurality of fuel injection pumps mounted therein, said housing having an opening in one wall thereof, a fuel filter comprising a casing closing said opening, and a fuel manifold extending from within said fuel filter through said opening and into said housing, means securing said manifold to said filter, and means securing said manifold to each of said fuel injection pumps.

7. In a compression ignition and the like engine having an engine block, a fuel injection pump housing adapted to be mounted on said block, a fuel filter secured to one face of said housing, a fuel transfer pump secured to another face of said housing, and a conduit connection between said transfer pump and said fuel filter.

8. In a compression ignition and the like engine having an engine block, a fuel injection pump housing adapted to be mounted on said block, a plurality of fuel injection pumps in said housing, a fuel filter secured to one face of said housing, a manifold connected to each of said fuel injection pumps for conducting fuel from said filter to said fuel injection pumps, a fuel transfer pump secured to another face of said housing, and a conduit connection between said transfer pump and said fuel filter.

9. In a compression ignition and the like engine having an engine block, a housing adapted to be mounted on said block, a plurality of fuel injection pumps mounted on said housing, a fuel filter mounted on said housing, a manifold connected to each of said fuel injection pumps for conducting fuel from said filter to said injection pumps, the connections from said manifold to said injection pumps being higher than the connection from said filter to said manifold, a fuel transfer pump mounted on said housing, and a conduit connection extending upwardly from said transfer pump to said filter.

10. In a compression ignition and the like engine, a fuel injection assembly adapted to be attached to said engine comprising a fuel injection pump housing for mounting on said engine and containing a plurality of fuel injection pumps, a fuel transfer pump for supplying fuel from a source to said fuel injection pumps and mounted on said housing exteriorly thereof, and a fuel filter mounted on said housing exteriorly thereof.

11. In a compression ignition and the like engine, a fuel injection assembly adapted to be attached to said engine comprising a fuel injection pump housing having means for detachable connection to said engine and containing a plurality of fuel injection pumps, a fuel transfer pump for supplying fuel from a source to said fuel injection pumps and detachably mounted on said housing exteriorly thereof, a fuel filter detachably mounted on said housing exteriorly thereof, and detachable conduit connections between said transfer pump and said fuel filter and between said fuel filter and said fuel injection pumps.

CARL G. A. ROSEN.